Patented May 19, 1942

2,283,275

UNITED STATES PATENT OFFICE 2,283,275

INSECTICIDAL COMPOSITION INCLUDING WALNUT SHELL FLOUR

Forrest M. McLane, Montebello, Calif., assignor to Stauffer Chemical Company, a corporation of Calif.

No Drawing. Application November 13, 1939, Serial No. 304,115

14 Claims. (Cl. 167—24)

This invention relates to parasiticidal and insecticidal emulsions containing rotenone and rotenoids. Rotenone is the active principle of certain plants known as fish poisons belonging to the order of Leguminosae and genera Derris, Lonchocarpus, Tephrosia, etc., known variously as derris, cube, timbo, barbasco, tuba, hairri, and the like. The term "Rotenoid" is used to designate the insecticidal principles of the same plant which are not exactly identical with rotenone in their chemical constitution, but have similar insecticidal action. Reference to one herein should be understood to include the other.

In the protection of citrus trees against spider and various scales, it is common practice to spray the trees, fruit, twigs, and branches with emulsions containing relatively highly purified nonvolatile oils. The application of these has, in some instances, given rise to damage of a serious nature, usually because of the viscous nature of the oil, and the heavy dosages required for effective control. In general, while oil is used to secure control over various pests on vegetation, its use is a reluctant one and the art, because of various recognized dangers and disadvantages, has sought to escape oil application.

The composition of the present invention enables commercial effective control to be secured and maintained over such pests as almond mite (Bryobia proetiosa); California citrus mite (Tenuipalpus californicus); two-spotted mite (Tetranychus bimaculatus); six-spotted mite (Tetranychus maculatus); common red spider (Tetranychus telarius); European red mite (Paretranychus pilosus); black scale (Saissetia oleoe); aphis, et cetera, and this without the utilization of the objectionable spray oil in the usual high insecticidal concentrations. Control is effected through the employment of rotenone as the effective insecticidal material. While, as is generally known, this material, if applied as such and alone, is not effective to provide commercial control over any of the foregoing mentioned pests, I have discovered that inclusion of an oily carrier material for the rotenone enables the rotenone to be effectively applied and commercial pest control secured. I have found that it is advantageous to employ the rotenone oily carrier mixture in conjunction with a carrier material like walnut shell flour so that when the walnut shell flour is applied to the foliage, fruit, or bark, the carrier material, together with the rotenone is gradually released from the flour and provides an effective control over a relatively extended period of time.

The walnut shell flour carrier consists of fine yellow-brown flakes soluble in distilled water to the extent of 1% to 2% by weight. They tend to acidify and buffer the water to a pH between 4.5 and 5.5. This carrier is innocuous to both plants and humans and has no independent insecticidal toxity. For use as an insecticide carrier it is preferable that the material have a particle size not in excess of 100 mesh screen, between 300 and 400 mesh screen being presently preferred. Other like materials can be employed instead of walnut shell flour, such as peach pit and apricot pit flour. These materials have numerous very fine ducts or passages in which the rotenone-oily carrier is stored and released in the spray tank. These materials are equivalents; for simplicity, only walnut shell flour will be referred to hereinafter and in the claims.

In making up a spray composition typical of those within the present invention I first made an extract of the rotenone by extracting cube with trichlorethylene, and concentrating the extract in a vacuum still until a semi solid mass remained. This was then dissolved in a suitable solvent such as trichlorethylene to give a solution of a desired rotenone concentration so that uniform results could be secured. The solvent carrying this extract, together with an emulsifier, if this be used, was then distributed by spraying on the walnut shell flour. The proportions employed were 1.75 pounds cube resin extract, 4.5 pounds of trichlorethylene and sufficient walnut shell flour to provide a dry free flowing mass.

If desired, the emulsifier can be carried in the dry material. For this purpose I have employed 7.5 pounds of Triol and 1.3 pounds of oleic acid mixed into the rotenone-solvent mixture and sprayed on the shell flour. Diatomaceous earth is also added to dry the composition, about 12 pounds usually suffices on the basis indicated. The earth assists in stabilizing the tank mix as well as the removal of any objectionable spray residue.

After the cube has been distributed on the walnut shell flour, from 1 to 20 pounds of an oily carrier such as a white oil can be added to the walnut shell flour. Where as much as 20 pounds of white oil is employed, 53 pounds of walnut shell flour and 12 pounds of diatomaceous earth are usually required to provide a dry material. This gives a dry mixture which can be packaged in paper bags. The white oil was a highly refined mineral oil of about 80 Saybolt.

The foregoing composition is ordinarily employed in the form of an emulsion, the proportions varying between one half pound to five pounds of the dry mixture in 100 gallons of water in the spray tank. From ⅓ of 1% to 1% of a suitable spray oil is also preferably employed in the spray tank. This is added separately to the tank although it can be carried on the flour if desired.

The emulsifier employed is usually a mixture of Triol, a sulphonated mineral oil, castor oil, olive oil mixture sold by L. Sonneborn & Sons, Inc., together with oleic acid. Other emulsifiers such as triethanolamineoleate can be employed, or the emulsion can be one carried or mixed separately in the white or spray oil, or the emulsion can be mechanically maintained. The emulsifier can be any one of the various well known materials employed for this purpose so long as the emulsion has the property of breaking quickly upon application and permitting rapid water runoff.

The rotenone oily carrier ratio can vary over fairly wide limits. The solvent is present to the end that the rotenone can be successfully applied to the walnut shell flour and mixed with the oil applied to the shell flour. When the material is applied of course the solvent, which is of a volatile nature and immiscible with water, evaporates, leaving the rotenone in the contact with the oily carrier on the flour. The carrier is believed to run out gradually from the fine openings in the walnut shell flour particles and carry the rotenone into contact with the pests. Because of the presence of the walnut shell flour this release takes place over an extended period of time so that effective and lasting pest control is assured. The range of solvents is a broad one. Butyl phthalate can be used as can any water immiscible, oil soluble saturated or unsaturated relatively volatile solvent.

In place of a spray oil or a white oil as the carrier, various mineral, animal, vegetable oils and oily carriers can be employed which have the property of being relatively viscous, non-volatile and non-drying at ordinary temperatures, so that the rotenone is only gradually carried out of the flour. Since the oily carriers are used in relatively small proportions, their purity, or sulphonatable content, is not important and highly refined oils do not have to be employed. Further, since the amount of oil applied in each instance is relatively small, one is free from the objection to the use of the usual oil spray emulsion. These have proven difficult to apply because of mechanical difficulties in their application. Further, they have a tendency to injure living vegetation when applied thereto at high concentrations. There are also findings that repeated applications over an extended period have been known to seriously interfere with the development and life cycle of the plant, depressing the plant metabolism and causing other undesirable plant physiological disturbances. These are obviated with the composition of the present invention.

I claim:

1. An insecticidal composition comprising walnut shell flour of smaller particle size than 100 mesh screen impregnated with rotenone as an insecticidal toxicant, and a viscous non-volatile non-drying oily carrier for the rotenone present as a surface coating on the impregnated carrier.

2. An insecticidal composition comprising as a major constituent walnut shell flour of smaller particle size than 100 mesh screen impregnated with a relatively small amount of rotenone, as an insecticidal toxicant, and a viscous non-volatile non-drying oily carrier for the rotenone present as a surface coating on the rotenone impregnated carrier.

3. An insecticidal composition comprising as a major constituent walnut shell flour of smaller particle size than 100 mesh screen impregnated with (1) a relatively small amount of rotenone, as an insecticidal toxicant, and (2) a mineral oil as a viscous non-volatile non-drying oily carrier for the rotenone.

4. An insecticidal composition comprising walnut shell flour of a smaller particle size than 100 mesh screen as a major dry carrier constituent and diatomaceous earth as a minor dry carrier constituent, said walnut shell flour constituent being impregnated with rotenone and a viscous, non-volatile, non-drying oily carrier therefor intimately incorporated therewith.

5. The method of manufacturing an insecticidal composition comprising mixing together walnut shell flour of a smaller particle size than 100 mesh with a substantially water insoluble volatile solvent carrying an insecticidally effective concentration of rotenone in solution to distribute the rotenone intimately on the flour, and then adding an oily rotenone carrier soluble in the solvent and intimately distributing said carrier on the flour.

6. An insecticidal composition comprising water, about 1% of a spray oil, an emulsifier therefor, about 0.01% to 1% of walnut shell flour impregnated with rotenone and a water insoluble, oil soluble rotenone carrier thereon.

7. An insecticidal composition comprising water, about 1% of a spray oil, an emulsifier therefor, about 0.01% to 1% of walnut shell flour impregnated with (1) rotenone dissolved in a rotenone solvent miscible with oil and of a volatile nature, and (2) a water insoluble, non-drying, non-volatile oil miscible with said solvent.

8. An insecticidal composition comprising water, about 1% of a spray oil, a mixture of a sulfonated oil and oleic acid as an emulsifier therefor, about 0.01% to 1% of walnut shell flour impregnated with rotenone dissolved in a water insoluble, oil soluble rotenone solvent.

9. A composition as in claim 1 wherein the walnut shell flour is of a size all less than 100 mesh screen and is substantially all between 300 and 400 mesh screen.

10. A composition as in claim 3 wherein the walnut shell flour is of a size all less than 100 mesh screen and is substantially all between 300 and 400 mesh screen.

11. An insecticidal composition comprising finely divided walnut shell flour all of a size passing a 100 mesh screen impregnated with a butyl phthalate solution of the active principle of a material selected from the group known as fish poisons, said impregnated flour carrying an oil as a surface coating.

12. An insecticidal composition comprising finely divided walnut shell flour all of a size passing a 100 mesh screen impregnated with an oil miscible solution of the active principle of a material selected from the group known as fish poisons, the impregnated flour carrying an oil as a surface coating.

13. An insecticidal composition for use as a spray with water comprising as a major component dry, finely divided walnut shell flour impregnated with a butyl phthalate solution of rotenone, and a viscous, non-volatile, non-drying oily carrier for the rotenone intimately incorporated with said flour, the composition carrying about 1 part rotenone to around 11 parts of oil.

14. An insecticidal composition for use as a spray with water comprising dry, finely divided walnut shell flour impregnated with a butyl phthalate solution of rotenone, a viscous, non-volatile, non-drying oily carrier for the rotenone intimately incorporated with said flour, and diatomaceous earth, the composition carrying about 1 part rotenone to about 11 parts of oil, fifty parts of walnut shell flour and diatomaceous earth to make up 100 parts.

FORREST B. McLANE.

CERTIFICATE OF CORRECTION.

Patent No. 2,283,275.  May 19, 1942.

FORREST B. McLANE.

It is hereby certified that error appears in the above numbered patent requiring correction as follows: In the grant, line 1, and in the heading to the printed specification, name of inventor, for "FORREST M. McLANE" read --FORREST B. McLANE--; and that the said Letters Patent should be read with this correction therein that the same may conform to the record of the case in the Patent Office.

Signed and sealed this 30th day of June, A. D. 1942.

Henry Van Arsdale,
Acting Commissioner of Patents.

(Seal)